United States Patent [19]

Schwarz

[11] Patent Number: 4,730,644

[45] Date of Patent: Mar. 15, 1988

[54] LOOM

[75] Inventor: Erwin Schwarz, Hindwil, Switzerland

[73] Assignee: Sulzer Brothers Limited, Switzerland

[21] Appl. No.: 939,034

[22] Filed: Dec. 8, 1986

[30] Foreign Application Priority Data

Dec. 17, 1985 [CH] Switzerland ............. 05368/85

[51] Int. Cl.[4] ........................................... D03D 49/60
[52] U.S. Cl. ................................... 139/188 R; 407/49
[58] Field of Search ............... 139/188 R, 192, 435; 384/7, 15, 24; 407/49, 108

[56] References Cited

U.S. PATENT DOCUMENTS

| | | | |
|---|---|---|---|
| 2,778,092 | 1/1957 | Bader | 407/49 |
| 2,996,158 | 8/1961 | Greenleaf | 407/49 |
| 3,700,292 | 10/1972 | Owens . | |
| 4,575,287 | 3/1986 | Oshnock et al. | 407/108 |

FOREIGN PATENT DOCUMENTS

| | | |
|---|---|---|
| 0122087 | 10/1984 | European Pat. Off. . |
| 1551284 | 11/1968 | France . |
| 2098357 | 3/1972 | France . |
| 2345610 | 10/1977 | France . |

Primary Examiner—Henry S. Jaudon
Attorney, Agent, or Firm—Burns, Doane, Swecker & Mathis

[57] ABSTRACT

In a device for securing cloth-forming parts (19) to the sley of a loom, two clamping members (71, 72, 91, 92) directed towards one another wedge-fashion are tightened on one another by a clamping screw (6), the clamping members bearing on one side in the sley by way of clamping surfaces (140, 141) disposed at an inclination to the screw axis. At least one of the parts bears on its other side directly on the cloth-forming part (19). The second clamping member (71, 72) can bear on its other side on the first clamping member (91, 92). Consequently, the securing elements (71, 91, 6) can be introduced preassembled into the corresponding groove (16) in the sley, so that assembly is rapid.

3 Claims, 5 Drawing Figures

LOOM

RELATED APPLICATION

The subject matter of this application is related to the subject matter of U.S. application Ser. No. 939,133 of Erwin Schwarz filed concurrently herewith.

BACKGROUND

The invention relates to a device for securing cloth-forming parts, such as a reed, to the sley of a loom, the sley being formed with a groove or a channel in which the part to be secured is disposed together with clamping elements.

In the development of looms having high picking rates achieved by high working frequencies, it is especially important that the rhythmically reciprocated elements be of very reduced mass. This applies more particularly to the sley and the parts secured thereto for picking and beating-up of the weft. However, the associated securing elements must be easy to control if loom downtimes are to remain short.

In modern machines the reed or, for example, the auxiliary nozzles in the case of air picking is or are usually received in a continuously drawn light metal section member to which such parts must be releasably connected. U.S. Pat. No. 4,489,762 illustrates a sley formed with continuous groove to receive securing elements. The grooves are adapted to receive T-section slide blocks as nuts for fixing screws. In other sleys without slide blocks, the sley is formed in its cross-section with tapped apertures which are relatively expensive to drill and may readily be damaged. In the kind of securing used in the United States patent specification, the assembly of the reed and auxiliary nozzles calls for some skill on the part of the operatives when the fixing screws are introduced into the tapped apertures into the readily displaceable slide blocks. This operation is correspondingly time-consuming. Another disadvantage of the solution known from the United States patent specification is the relatively large amount of material needed for the trapezoidal-section guide grooves for the reed and auxiliary nozzles and for the T-groove below.

BRIEF DESCRIPTION OF THE INVENTION

It is an object of this invention to obviate the disadvantages of known solutions by providing a securing device which enables presassembled elements to be inserted rapidly into the sley and which is also compact and cheap. According to the invention, the clamping elements are in the form of clamping members which are directed towards one another wedge-fashion, are tightened on one another by a clamping screw and bear in the sley as they are tightened by way of clamping surfaces disposed at an inclination to the screw axis, at least one clamping member bearing on its other side directly on the cloth-forming part. One of the clamping members can be longer than the other and be formed with a number of bores to receive clamping screws, such member being pressed into the groove in the sley by means of a number of pushed-through clamping screws and associated clamping members formed with tapped apertures. The second clamping member can bear on one side on a bearing surface of the first clamping member. A compression spring which extends around the screw is interposed between the first and second clamping members and, with the clamping screw untightened, keeps the clamping members apart from one another along the screws axis.

This construction a permits rapid assembly and provides a securely fitting screwed connection which is also compact. In assembly and servicing work the clamping element and the clamping screw for securing a cloth-forming part can be introduced into the sley as a preassembled unit, since the internal width of the sley groove as measured transversely to the direction in which the clamping element is pushed in is larger than the corresponding width of the clamping element.

BRIEF DESCRIPTION OF THE DRAWINGS

Various embodiments of the invention will be described hereinafter with reference to the Figures wherein.

DETAILED DESCRIPTION OF PREFERRED EMBODIMENTS

Figure 5:
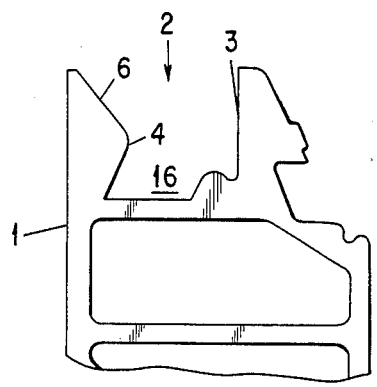
FIG. 5 is a view similar to FIG. 2 and FIG. 3 but with the reed and clamping components removed from the sley.

The cross-sectional configuration of the top portion of the sley is shown in FIG. 5. It includes an upwardly opening channel 2 in the top face thereof. The front of channel 2 has a substantially vertical front wall 3. The bottom portion of the channel 2 is formed by a groove 16 having a forwardly and upwardly inclined rear wall 4, and the top portion of channel 2 is formed by a trough having a forwardly and downwardly inclined rear wall 5 intersecting the rear wall 4 of the groove 16. The loom reed unit 19 has a vertically extending lower portion which fits into the channel 2 in abutting relation to the front wall 3.

Figure 2:
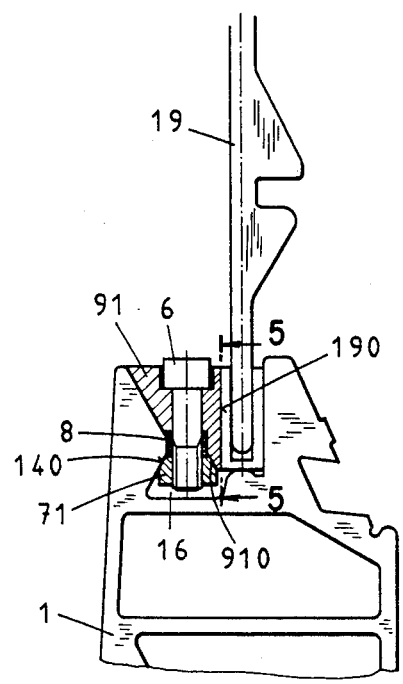
FIGS. 2 and 3 are corresponding views of two embodiments locking lengthwise of the sley.
Figure 3:
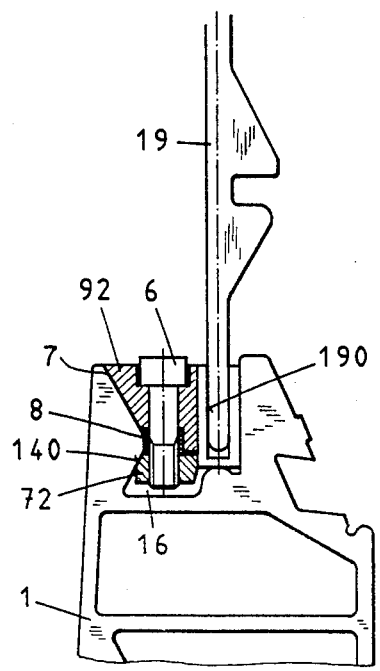

FIGS. 2 and 3 show two embodiments of the invention as used to secure a reed 19. In addition to the clamping member 71, 72 and associated clamping screw 6 there is provided as second clamping member a clamping rail 91, 92 respectively which, when screws 6 are tightened, is pressed into channel 2 in sley 1 and because of its wedge-shaped cross-section moves the reed 19 to the right against the sley 1 to clamp the lower part 190 of the reed unit 19 fast. The clamping action results from cooperation between inclined walls 4 and 5 of the channel 2 in the top of the sley and the clamping members that contact such walls. The lower clamping members 71, 72 each have upwardly and forwardly inclined surfaces 140 that bear against the inclined wall 4, and the upper clamping members 91, 92 each have surfaces 7 which bear against wall 5, upon rotation of the screws 6 in a direction to bring the upper and lower clamping members closer together.

The embodiments of FIGS. 2 and 3 differ from one another in the manner in which the right sides of the lower clamping members 71, 72 coact with adjacent parts. While the clamping member 71 on the left-hand side bears on clamping surface 4 of the sley, it bears on the other side on the clamping rail 91. By way of the rail 91 the clamping member 71 applies a force to the bottom part of the clamping zone of the reed 19. In the embodiment of FIG. 2, that surface 910 of rail 91 on which the clamping member 71 is adapted to bear is inclined to the axis of clamping screws 6 at the same angle as clamping surface 5 is inclined to such axis. In FIG. 3 the clamping member 72 extends to the right as far as clamping surface 190 of reed 19 which is therefore held fast both by rail 92 and also by clamping member 72.

Figure 1:
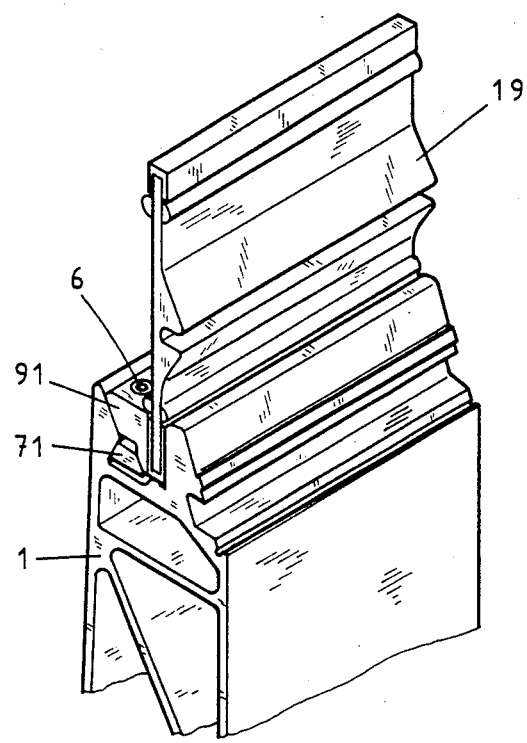
FIG. 1 is a perspective view of a part of sley 1.
Figure 4:
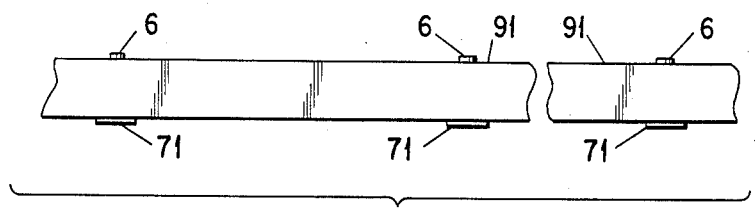
FIG. 4 is a view along the line 4—4 in FIG. 2 of the front face of the upper clamping member of the invention showing its substantial extent along the length of the sley.

The rail 91, 92 can extend over the whole length of the reed in the picking direction or be subdivided into discrete parts. A preferred arrangement is indicated diagrammatically in FIG. 4 where clamping rail 91 is shown as extending along a substantial portion of the length of the sley, with individual screws 6 and clamping members 71 associated therewith at intervals along its length. Advantageously, the clamping members 71, 72 are associated with individual clamping screws 6, and their length in the weft direction is only a multiple of the diameter of the screw-threading of the screws.

The embodiments of the invention described ensure rapid and accurate assembly of the sley.

The spring elements 8 of FIGS. 2 and 3, shown in this case as helical springs, ensure that, with the reed 19 demounted, the rails 91, 92 do not drop into the groove 16 and thus form an obstacle when the reed 19 is introduced.

In assembling the constructions shown in the drawings, the several lower clamping members 71, 72 may be attached loosely to the corresponding upper clamping members 91, 92 prior to their insertion into the upwardly opening channel at the top of the sley 1. In this condition of the parts, the springs 8 will support the upper clamping members 91, 92 above and spaced from the lower clamping members 71, 72, and these pre-assembled parts may be lowered into the sley channel far enough for the lower clamping members 71, 72 to enter the bottom groove portion 16 of the channel, with the upper clamping members 91, 92 remaining in the upper trough portion of the channel. The reed unit 19 may be lowered into the channel after the clamping members 71, 72, 91, 92 have been lowered into the channel but before the upper clamping members 91, 92 have been dropped to their lowermost and forwardmost positions. When the reed unit 19 is lowered into the channel, it is located in front of the upper clamping member 91, 92 in abutting relation to the vertical front wall of the channel as shown in the drawings. Then the upper clamping members 91, 92 are allowed to drop fully and the screw means 6 are rotated to clamp all the parts in their finally assembled positions.

Although the invention has been described with relation to certain embodiments illustrated in the drawings, variations and modifications are possible and it is intended that the scope of the invention be ascertained from the claims which follow.

What is claimed is:

1. A loom comprising a sley having an upwardly opening elongated channel in the top face thereof extending along the length of the sley, the front of said channel being formed by a substantially vertical front wall, the bottom portion of said channel being formed by a groove having a forward and upwardly inclined rear wall, and the top portion of said channel being formed by a trough having a forwardly and downwardly inclined rear wall intersecting said rear wall of said groove; a reed unit having a vertically extending lower portion extending into said channel in abutting relation to said front wall; a first clamping member adapted to be inserted downwardly into said groove and having an upwardly and forwardly inclined surface for cooperation with said rear wall of said groove; a second clamping member insertable downwardly into said trough, having a rear surface bearing against said rear wall of said trough, and having a front surface bearing against the rear of said lower portion of said reed unit; and screw means for drawing said first and second clamping members toward one another to hold said clamping members and said lower portion of said reed unit in place in said channel.

2. A loom comprising a sley having an upwardly opening elongated channel in the top face thereof extending along the length of the sley, the front of said channel being formed by a substantially vertical front wall, the bottom portion of said channel being formed by a groove having a forwardly and upwardly inclined rear wall, and the top portion of said channel being formed by a trough having a forwardly and downwardly inclined rear wall intersecting said rear wall of said groove; a reed unit having a vertically extending lower portion extending into said channel in abutting relation to said front wall; a first clamping member adapted to be inserted downwardly into said groove and having an upwardly and forwardly inclined surface for cooperation with said rear wall of said groove; a second clamping member insertable downwardly into said trough, having a rear surface bearing against said rear wall of said trough, and having a front surface bearing against the rear of said lower portion of said reed unit; screw means for drawing said first and second clamping members toward one another to hold said clamping member and said lower portion of said reed unit in place in said channel; and compression spring means between said clamping members to urge the upper one of said clamping members upwardly so as to guard against dropping such clamping member into said groove when said screw means permits movement of said clamping members away from one another.

3. A loom according to claim 2, wherein said second clamping member extends along a substantially portion of the length of the sley, and wherein a plurality of said first clamping members are provided for cooperating with said second clamping member.

* * * * *